United States Patent [19]

Jameson et al.

[11] 4,378,163
[45] Mar. 29, 1983

[54] OUTPUT COUPLING FOR CONCRETE MIXER TRANSMISSION

[75] Inventors: James J. Jameson, Coffeyville; Fred L. Mount, Independence; Joe L. Fernandez, Coffeyville, all of Kans.

[73] Assignee: Cooper Industries, Inc., Houston, Tex.

[21] Appl. No.: 343,640

[22] Filed: Jan. 28, 1982

Related U.S. Application Data

[62] Division of Ser. No. 134,719, Mar. 27, 1981, Pat. No. 4,335,963.

[51] Int. Cl.³ .............................................. B28C 5/42
[52] U.S. Cl. ..................................................... 366/63
[58] Field of Search ................ 464/74, 156, 158, 159, 464/178, 183; 366/63

[56] References Cited

U.S. PATENT DOCUMENTS

| | | | |
|---|---|---|---|
| Re. 27,445 | 8/1972 | Kuehn | 464/156 X |
| 2,518,481 | 8/1950 | Maguire | 464/158 X |
| 2,563,336 | 8/1951 | Jaeger . | |
| 2,659,585 | 11/1953 | McCallum | 464/159 X |
| 2,732,189 | 1/1956 | Gerst . | |
| 3,070,979 | 1/1963 | Shipley et al. | 464/154 |
| 3,405,603 | 10/1968 | Woodling | 464/158 X |
| 3,658,303 | 4/1972 | Funk . | |
| 3,782,866 | 1/1974 | McDermott | 464/156 X |
| 3,851,862 | 12/1974 | Mihulonicz | 464/158 X |
| 3,912,239 | 10/1975 | Ries . | |
| 4,006,946 | 2/1977 | Mann et al. . | |
| 4,124,304 | 11/1978 | Suganuma | 366/63 X |

*Primary Examiner*—Philip R. Coe
*Attorney, Agent, or Firm*—Eddie E. Scott; Michael D. McCully

[57] ABSTRACT

One end of a rotatable mixer drum is journalled by a spherical bearing mounted on the housing of a power transmission having its rotary output coupled to the drum by a drive shaft which axially penetrates the bearing. Arcuate splines at opposite ends of the drive shaft mesh with gear teeth of the transmission output gearing and with gear teeth carried by the drum whereby the shaft is free to deflect with respect to the transmission gearing and the drum gearing when the spherical bearing deflects as a result of drum-to-transmission misalignment. The shaft is arranged with respect to the bearing and the gear teeth engaged by its splines so that the total deflection of the bearing is divided between the ends of the shaft.

3 Claims, 3 Drawing Figures

OUTPUT COUPLING FOR CONCRETE MIXER TRANSMISSION

This is a division, of application Serial No. 134,719 filed Mar. 27, 1981, and now U.S. Pat. No. 4,335,963.

BACKGROUND OF THE INVENTION

This invention relates to an improved coupling between the downwardly inclined forward or rearward end of a truck-mounted concrete mixer drum and the output of the gear train of a power transmission apparatus mounted on the truck for rotatably driving the drum.

It is known to journal one end of a mixer drum on the housing of a rotary power transmission by means of a spherical type bearing thereby to accommodate axial misalignment between the drum and transmission due to deflection of the truck frame upon which these massive devices are mounted. Prior patents to Jaeger U.S. Pat. No. 2,563,336; Gerst U.S. Pat. No. 2,732,189; Funk U.S. Pat. No. 3,658,303; and Ries U.S. Pat. No. 3,912,239 show this use of a spherical bearing in a mixer drum and transmission combination.

While provision of spherical type journals for the drum allows limited oscillatory and nutational movement between the drum and the transmission housing, additional means must be provided to couple efficiently the torque of the transmission to the drum even under maximum conditions of misalignment between their respective rotational axes; otherwise, the gears and bearings of the transmission will be subject to severe strain and resultant excessive wear and possible damage. This objective has been realized to some extent by providing a transmission output gear wheel which imparts rotary driving force to a meshing gear attached to the drum as shown in prior patents to Mikulowicz U.S. Pat. No. 3,851,862 and Mann et al. U.S. Pat. No. 4,006,946. These prior art devices employ spherical journals for the drum-to-transmission mounting and have arcuate gear teeth formed on the output coupling gear. In both prior art devices the drive coupling gears are necessarily greater in diameter than the spherical bearing and the gear bodies are specially configured to locate the outer rim thereof in radially surrounding relation with the bearing whereby the longitudinal center points of the arcuate teeth lie in a plane which contains the center of the spherical bearing.

While the aforedescribed prior art devices are capable of torque transmission under conditions of misalignment, the use of known output drive gears in this application entails a specialized gear wheel configuration of substantial diameter. Moreover, the gear teeth must be not only great enough in number and size to withstand high unit driving pressure, but the arcuate drive surface area of the teeth must have a longitudinal dimension across the rim of the gear great enough to provide adequate driving contact over the full range of tooth misalignment permitted by the spherical bearing. As the size and weight of mixer trucks and drums increases, the flexure of the structural members of the truck frame, hence the potential for drum-to-transmission misalignment, increases accordingly. Moreover, the torque required to effect drum rotation has increased as larger payloads are carried by mixer trucks. To those skilled in the art, it will be apparent that under such conditions of increased potential for misalignment and greater torque, a wheel-type gear coupling between the drum and the transmission would have to be altered in size or strength, or perhaps both, to provide enough usable tooth engagement surface to withstand higher unit loading along with greater misalignment between meshing teeth. From the standpoint of weight, compactness and cost, it is undesirable to upgrade the torque transmitting and misalignment tolerance characteristics of such already bulky output gear couplings by the simple expedient of further enlargement and strengthening.

SUMMARY OF THE INVENTION

The principal object of this invention is to provide an improved transmission-to-mixer drum coupling member having these substantial advantages:

(a) A high degree of drum-to-transmission misalignment permitted by a spherical drum journal can be tolerated with low wear and minimal risk of damage to the transmission components;

(b) Torque loads transmitted to the drum can be increased by the substitution of a ruggedly splined drive shaft in place of the largediameter gear wheel used in prior art couplings; and (c) The functional benefits described in (a) and (b) above are obtainable in a compact arrangement whereby the rotary drive shaft extends axially through the spherical bearing for flexibly coupling the last stage of the transmission gear train to the body of the drum.

Another object is to provide the rotary drive shaft with external crowned splines formed on its cylindrical outer surface adjacent its opposite ends for respective driving engagement with meshing gear teeth on the drum and on an element of the transmission gear train whereby the shaft is free to float or nutate about its longitudinal axis yet maintain good driving contact between the meshed splines and gear teeth.

Another more detailed object is to provide coincidence of the midpoint of the longitudinal axis of the drive shaft and the centerpoint of the spherical bearing surrounding the middle portion of the drive shaft whereby a given angular deflection of the spherical bearing with respect to the transmission frame is divided to approximately equally between the crowned splines formed at opposite ends of the drive shaft and the gear teeth in mesh with the respective splines.

DESCRIPTION OF THE PREFERRED EMBODIMENT

Figure 1:
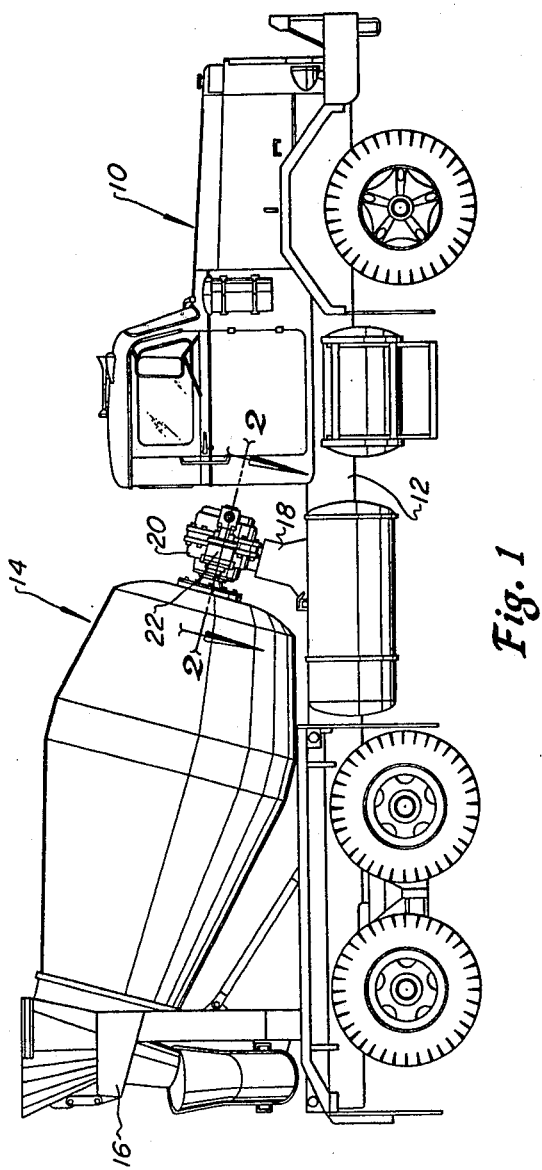
FIG. 1 is a side elevational view of a concrete mixer truck.

In FIG. 1 of the drawing, numeral 10 indicates, in its entirety, a concrete mixer truck of modern structure and operation having a chassis 12 rotatably supporting a hollow mixer drum 14 between an upright frame 16 and a pedestal 18 located forward of the downwardly inclined front end of the drum. A power transmission 20 is mounted on the pedestal 18 in axial alignment with the drum 14 and serves to journal the front end of the drum. Mounted on the housing of the transmission 20 is a hydraulically driven rotary motor 22 which may be supplied by a pump, not shown, driven by the engine of truck 10.

It is common that the drum 14 be sized to mix, transport and deliver to the work site up to fourteen or more cubic yards of wet concrete. As the truck traverses the typically rough work site terrain its chassis 12 bends and twists unavoidably under the great combined weight of the drum and its contents. Such flexure of the chassis is imparted to the upright frame 16 and the pedestal 18 which, along with the tumbling of the wet concrete mass within the drum, produces a nearly constant condition of misalignment between the rotary axis of drum 14 and the transmission housing upon which the drum is rotatably supported. Without means to tolerate such operational misalignment, thereby eliminating the stresses created in the drum, transmission and pedestal, physical damage to these structures will occur. Due to the size of the drum 14 and the great weight of concrete usually mixed and carried within the drum, the transmission 20 has a very substantial maximum torque output on the order of 37,500 pound feet. Provision of an output coupling device for transmission 20 which functions well under such loading and under the conditions of drum-to-transmission misalignment just described is the principal object of this invention.

Figure 2:
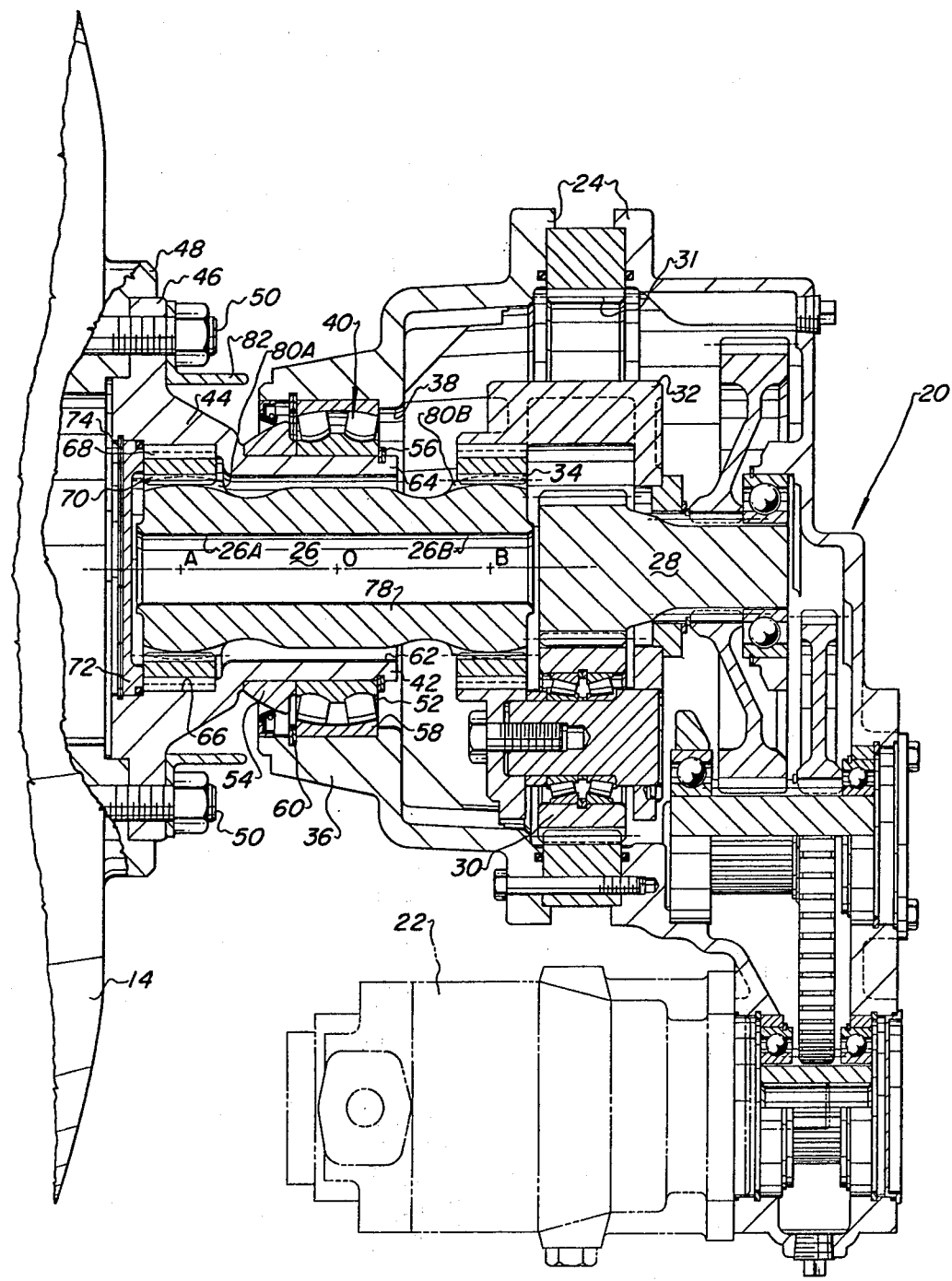
FIG. 2 is a sectional view of a power transmission mounted on the truck taken generally along lines 2—2 of FIG. 1.

Turning now to the transmission 20, as best shown in FIG. 2, a plural part transmission housing 24 contains conventional gear train elements which reduce the speed of the motor 22 to a desired final rotational speed and torque for an output shaft 26 which drives the drum 14. For a full description of the structural and operational details of the gear train itself, reference may be made to the prior patent to Funk U.S. Pat. No. 3,749,372. In accordance with Funk, the sun gear 28 drives planet gears 30 which are also meshed with a ring gear 31. The planet gears 30 are rotatably journalled by the planet carrier 32 which comprises the final output drive element of the gear train. The torque output of carrier 32 is coupled to the output shaft 26 at the latter's right hand end, as viewed in FIG. 2, by means of gear teeth 34 formed internally in the apertured wall of the carrier.

The wall 36 of housing 24 extends toward drum 14 and is apertured at 38 to receive and retain coaxially therein a conventional spherical roller bearing indicated in its entirety by numeral 40. Also received in aperture 38 is a projecting cylindrical boss 42 of a drum mounting shaft 44 which also has an annular flange 46 secured to a bolt ring 48 formed on the forward end of drum 14 by means of bolts 50. The inner race 52 of bearing 40 is nonrotatably clamped about the boss 42 between a generally conical member 54 fixed to boss 42 and snap rings 56 which seat in an annular groove near the distal end of boss 42. The outer race 58 of bearing 40 is nonrotatably clamped in engagement with the wall of aperture 38 between a shouldered portion of housing 24 and snap rings 60 which seat in an annular groove in the wall aperture 38. In a manner well known to those familiar with spherical type bearings, the inner race 52 is not only rotatable with respect to the outer race 58, but is also capable of limited nutative movement with respect to the outer race 58. It follows that the mounting shaft 44 is also provided a rotary and nutative journal with respect to housing 24 by the utilization of bearing 40. By this device the nominally coaxial boss 42 and housing aperture 38 are permitted a predetermined degree of relative angular misalignment to accommodate angular flexure of the drum 14 relative to the housing 24.

The drum mounting shaft 44 has a stepped longitudinal bore 62 forming a cylindrical wall 64 for the boss 42 and a cavity 66 which receives a gear ring 68 having internal teeth 70. Gear ring 68 is nonrotatable with respect to the shaft 44 and is retained between a shoulder of the stepped bore 62 and a sealed cover plate 72 which is, in turn, held in the stepped bore 62 by snap rings 74.

Referring now to the structural details of the improved output coupling or drive shaft 26 of the transmission 20, the shaft comprises an elongate body which may be centrally bored to reduce its mass. However, in the interest of providing high torsional strength in a compact structure, the wall 78 is left thick and the length to diameter ratio of the body is as low as possible having regard for the other dimensional requirements of the shaft. The shaft is symmetrical about its center point O and is, therefore, perfectly balanced for rotation. While the shaft may be conveniently assembled end-for-end from the position shown in FIGS. 2 and 3, for convenience of description only, end 26A will be called its output end and end 26B will be called its input end. Shaft ends 26A and 26B are machined to provide identical sets of crowned or arcuate splines 80A and 80B about their outer cylindrical surfaces. Reduced diameter necks adjacent the splines 80A and 80B are formed coincident to the machining of the splines and give the shaft 26 its characteristic "dog bone" appearance. The midpoint of the longitudinal dimensions of the respective sets of splines or the crests of the splines define parallel planes which are normal to the centerline AB when there is no misalignment between the drum 14 and transmission housing 24 as is represented in FIG. 2. Such planes intersect centerline AB at points A and B, respectively.

In the condition shown in FIG. 2, the shaft 26 extends coaxially within the stepped bore 62 of the drum mounting shaft 44 with its output end 26A in driving relation with the gear ring 68 due to the meshing engagement of splines 80A and teeth 70. At its input end 26B, the shaft splines 80B mesh with the planet carrier teeth 34 to receive driving torque from this final speed reduction stage of the transmission gear train. The spherical bearing 40 is located intermediate to gear ring 68 and the carrier 32 so that its centerpoint is coincident with point O, the geometric centerpoint of the shaft 26, when there is no deflection between bearing 40 and transmission housing 24.

From the foregoing description, it will be appreciated that the shaft 26 is supported at ends 26A and 26B in floating relationship to the mounting shaft 44 and the carrier 32, i.e. due to the arcuate configuration of the splines 80A and 80B, the ends 26A and 26B are capable of nutative motion about points A and B with respect to gear ring teeth 70 and carrier teeth 34 respectively. Longitudinal displacement of the shaft 26 is limited by abutting contact of shaft end 26A with plate 72 and shaft end 26B with the sun gear 28.

Figure 3:
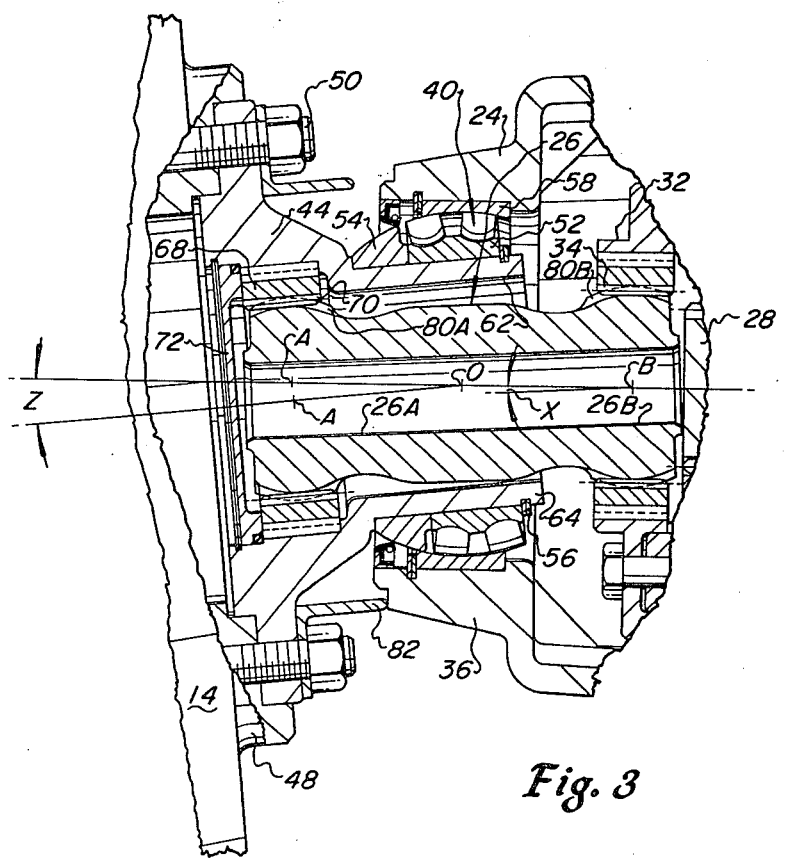
FIG. 3 is an enlarged fragment of the sectional view in FIG. 2 showing certain transmission components in altered operational positions.

An appreciation of the mode of operation of this invention will be had from a comparison of FIG. 2, wherein the drum 14 and housing 24 are in alignment and there is no angular deflection of the inner and outer races of spherical bearing 40, with FIG. 3 wherein the common axis of the drum 14 and of its mounting shaft is depressed from its FIG. 2 position through an angle Z. The angle Z represents the maximum degree of drum-to-housing misalignment that can be accommodated by the spherical bearing 40 as determined by the abutment of the projecting flange 82 of a drum-mounted stop ring against the housing wall 36. As the spherical bearing inner race 52, shaft 44 and gear ring 68 pivot together downwardly about the centerpoint O of the bearing 40 through angle Z, the shaft 26 will pivot downwardly about the centerpoint B of its input end 26B through a smaller angle X whereby the centerpoint A of shaft output end 26A will move from point A to point A'. If angle X is small, say less than about four or five degrees, angle X very closely approximates one half angle Z.

In the circumstance described above, the splines 80B will pivot relative to the carrier teeth 34 about point B through an angle equal to angle X; and, the splines 80A and ring gear teeth 70 will move relative to one another, as point A moves along an arc to point A', through an angle which is very nearly equal to angle X. Thus, the movement of the drum 14 with respect to the housing 24 through angle Z produces relatively equal angular deflections between the spline and gear teeth combinations 80A and 70 and 80B and 34, respectively, whereby the sum of these deflections occurring at opposite ends of the shaft is equal to the total drum-to-housing deflection. Stated otherwise, axial misalignment of the drum and housing which causes the spherical bearing to deflect between predetermined limits is divided between the driving end 26A and the driven end 26B of the output shaft 26 in approximately equal proportions.

Since the total deflection of the bearing 40 is divided between the ends of shaft 26, the relative angular movement between the splines 80A and planet carrier teeth 34 is only a fraction of total bearing deflection. Herein lies an important difference between this invention and the prior art devices discussed above as well as a key advantage obtainable from this invention. One long-standing problem in the use of speed reduction transmissions to drive mixer drums has been the shortness of life of the gear train components due to the unavoidable reverse coupling of forces which create drum-to-transmission misalignment back to the final output stage of the gear train. This condition is manifest in the prior art devices as well as in the present invention due to nearly constant deflection between the arcuate teeth of the coupling and the meshing teeth of an associated gear train element. Since this deflection involves tooth-to-tooth sliding contact under very high unit pressure, even where the contacting teeth are subject to a bath of lubricant in oil flooded transmission cases, such sliding contact produces early and rapid tooth wear. Moreover, due to unavoidably frictional coupling of such deflection to the final output gear of the transmission, the entire gear train and the bearings journaling its elements are constantly subjected to a feedback of drum-to-transmission deflection resulting in wear-producing dynamic imbalance and fluxuating stress. In accordance with this invention, the deflection between the splines 80B and teeth 34 is approximately one half of the total drum-to-transmission deflection whereby the previously acute wearing due to sliding contact between meshed splines 80B and teeth 34 is reduced accordingly. For the same reason, the magnitude of the undesirable defective forces fed back through this unavoidable frictional coupling to the transmission components are beneficially reduced.

While the herein described embodiment of the invention contemplates an approximately equal division of drum-to-transmission deflections of relatively small angular magnitudes between the opposite ends 26A and 26B of shaft 26, the described benefits of the invention can be realized to some extent where the deflections of the respective ends of the shaft are considerably unequal yet equal in total to the deflection of the spherical bearing 40. Such inequality of shaft end deflection could occur in varying degrees if the angle Z exceeds more than about four or five degrees or if the points A, O and B are located other than in the relationship described herein.

As a further direct result of the approximate halving of the spherical bearing deflection between the splines 80A and 80B and the respective gears in mesh with them, the spline configuration required to accommodate relative angular tilting therebetween under maximum deflection conditions can have arcuate teeth of a substantially greater arc radius than would be the case where a single set of arcuate gear teeth is employed. Thus, the output shaft 26 of this invention has splines exhibiting low radial projection making them well adapted structurally for transmitting very substantial torque loads. Still the splines, because of their length, have generous pressure and wear surface areas in contact with meshing gear teeth even under maximum deflection conditions. These characteristics of the splines 80A and 80B and the overall ruggedness and compactness of the shaft 26 lend to a superior output coupling for a high torque concrete mixer transmission.

The longer wear life and ruggedness of a mixer transmission constructed in accordance with this invention will be appreciated since concrete mixer trucks, when idled for unscheduled, expensive transmission repairs, provide no return on a very substantial investment. Such trucks are commonly operated around the clock where very large concrete jobs are involved; therefore, routine maintenance is often neglected to the detriment of the mixer transmission. Accordingly, the ruggedness and longer life exhibited by this invention has the potential to keep mixer trucks in service in spite of such unfavorable maintenance practices.

Having disclosed a preferred embodiment and mode of operation of the invention and having pointed out with particularity how the objects of the invention are attained,

We claim our invention is:

1. A vehicular mixer comprising: a vehicle, a motor driven torque transmission mounted on said vehicle, a mixer drum having one end rotatably journalled on said vehicle and the other end journalled by a spherical bearing for relative rotation and axial deflection with respect to said transmission; said transmission having a driving gear in axial alignment with a driven gear of said drum; a rotary drive shaft extending through said spherical bearing for coupling driving torque from said transmission to said drum and having sets of splines at opposite ends in meshing engagement with said driving and driven gears.

2. The vehicular mixer defined in claim 1 wherein said splines at the shaft ends are arcuate in lateral profile and said shaft ends are pivotable with respect to said driving and driven gears in response to axial misalignment between said driving and driven gears due to axial deflection between said transmission and said drum.

3. The vehicular mixer defined in claim 2 wherein a point on the rotary axis of said shaft midway between the respective pivot points of said shaft ends is coincident with the centerpoint of said spherical bearing, whereby pivoting movement between either set of splines and the gear in engagement therewith is equal to approximately one half of the axial misalignment between said driving and driven gears.

* * * * *